W. DONAGHY.
TRACTION WHEEL.
APPLICATION FILED SEPT. 17, 1917.

1,324,107.

Patented Dec. 9, 1919.

INVENTOR
William Donaghy
BY
L. L. Westfall
ATTORNEY

UNITED STATES PATENT OFFICE.

WILLIAM DONAGHY, OF SPOKANE, WASHINGTON.

TRACTION-WHEEL.

1,324,107.      Specification of Letters Patent.      Patented Dec. 9, 1919.

Application filed September 17, 1917. Serial No. 191,905.

*To all whom it may concern:*

Be it known that I, WILLIAM DONAGHY, a citizen of the United States of America, residing at Spokane, in the county of Spokane and State of Washington, have invented certain new and useful Improvements in Traction-Wheels, of which the following is a specification.

This invention pertains to wheels for tractors and has for its object to provide a wheel of the character mentioned that will automatically adjust itself to uneven surfaces and especially to sloping surfaces and side-hills. A special object is to provide a wheel of the character mentioned that will automatically adjust the periphery of the wheel to such sloping ground and side-hills, especially where the surface is soft or muddy, in order to have a continuous, complete peripheral bearing surface.

With the foregoing and other objects in view the invention consists of the combination and arrangement and in the detail construction hereinafter described and claimed, it being understood that changes in the precise embodiment of the invention herein disclosed may be made within the scope of the claims without departing from the spirit of the invention or sacrificing any of its advantages.

In the accompanying drawings forming a part of this specification—

Figure 1:
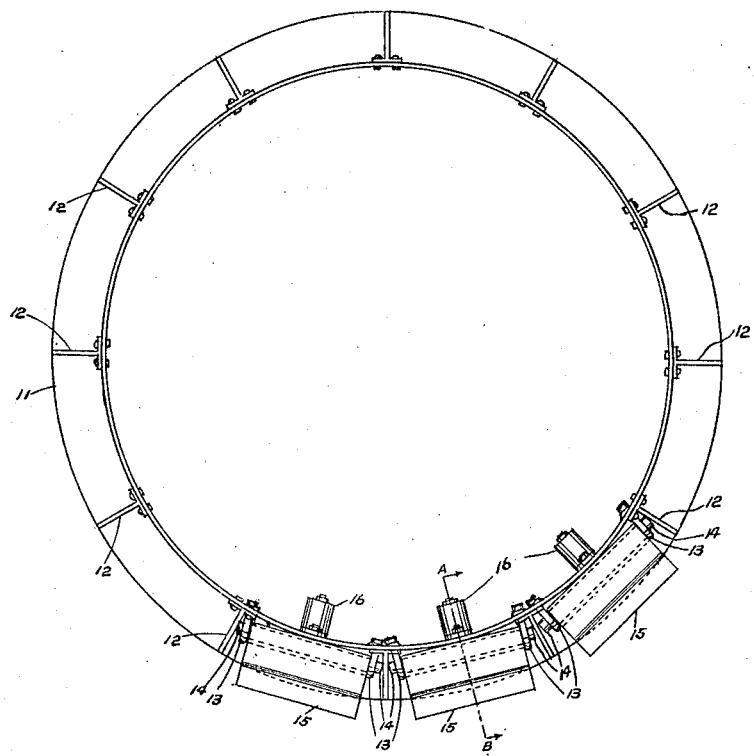
Figure 2:
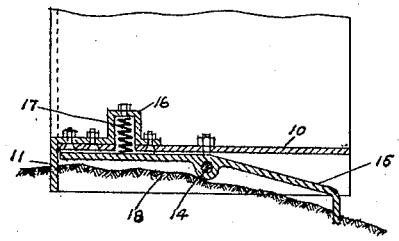
Figure 3:
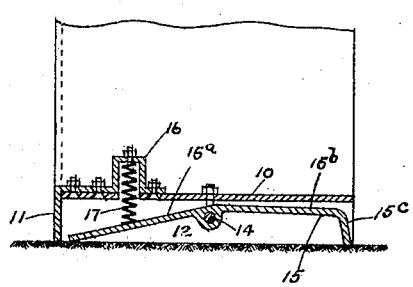
Figure 4:
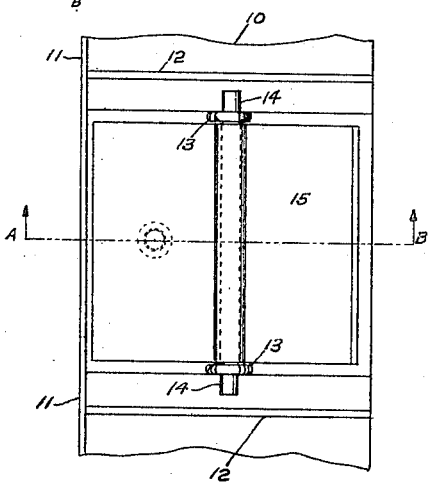

Figure 1 is a side elevation of the felly only of a wheel with the invention attached thereto, Fig. 2 is a sectional view taken on the line A—B of Figs. 1 and 4 showing the parts in the position they automatically occupy when the wheel is passing over a sloping surface, Fig. 3 is the same view with the parts shown in the position they occupy while the wheel is passing over a level surface, and Fig. 4 is a broken-away front view of Fig. 1.

In a detail description a felly 10 is provided at one side with an outwardly extending flange 11 extending completely around the periphery thereof. In spaced relation to each other around the periphery of the felly 10 and at right angles with the flange 11 are ribs 12, the same extending outwardly flush with the flange 11. Attached to the felly 10 and extending outwardly therefrom in pairs between the ribs 12 are eyelets 13 in which are rotatably mounted shafts 14 upon which are tiltably mounted plates 15 having a flat portion 15$^a$, a flat portion 15$^b$ set at a slight angle with the portion 15$^a$ and a portion 15$^c$ set at approximately right angles with the portion 15$^b$. The portion 15$^c$ is intended to serve as a flange for the wheel and to correspond with the flange 11 but to be automatically adjustable as will be hereinafter described. Set in the periphery of the felly 10, one each to correspond with each of the plates 15 are cups 16 in each of which is mounted a coil spring 17 adapted to bear against the surfaces 15$^a$ of the plates 15. When the wheel is running over a level surface the plates 15 automatically adjust themselves to substantially the position shown in Fig. 3 so that the portions 15$^c$ form a flange on one side of the periphery of the felly 10 corresponding with the flange 11 on the other side of the felly 10. When the wheel is running over a hill-side, assuming that the side of the wheel having the permanent flange 11 is on the upper side of the grade, the portion 15$^a$ of the plate 15 strikes or bears against the surface of the earth 18, as the flange 11 sinks into the earth, which has the effect of rocking the portions 15$^b$ and 15$^c$ downwardly on the shaft 14 so that the portion 15$^c$ is adjusted to a bearing position on the surface of the earth 18 to the same effect as though the wheel was running over a level surface, thus the wheel has both flanges and the other surfaces of the wheel in substantial bearing contact with the earth at all times. The coil springs 17 aid in the adjustments mentioned. The ribs 12 serve to hold the shafts 14 in their position in the plates 15.

The rocking of the plates 15 has the further effect of causing the portions 15$^a$ to keep clean and free from the dirt the permanent flange 11 and the other surfaces of the wheel.

Having invented a strong, simple and inexpensive construction, thoroughly efficient in operation, what is claimed is:

1. A traction wheel provided with one permanent peripheral flange at one side of the wheel, peripheral cross-ribs set at substantially right angles to said permanent flange, an automatically adjustable flange at the other side of said wheel to correspond with said permanent flange and rockable plates integral with said adjustable flange, said plates lying between said permanent flange and said adjustable flange.

2. A traction wheel provided with one permanent peripheral flange at one side of the wheel, peripheral cross-ribs set at substantially right angles to said permanent flange, an automatically adjustable flange at the other side of said wheel to correspond with said permanent flange and rockable plates integral with said adjustable flange, said plates lying between said permanent flange and said adjustable flange, and springs mounted in the periphery of the wheel and bearing against said plates.

In testimony whereof I affix my signature in presence of two witnesses.

WILLIAM DONAGHY.

Witnesses:
J. E. McANDREW,
L. L. WESTFALL.